Figure 3:
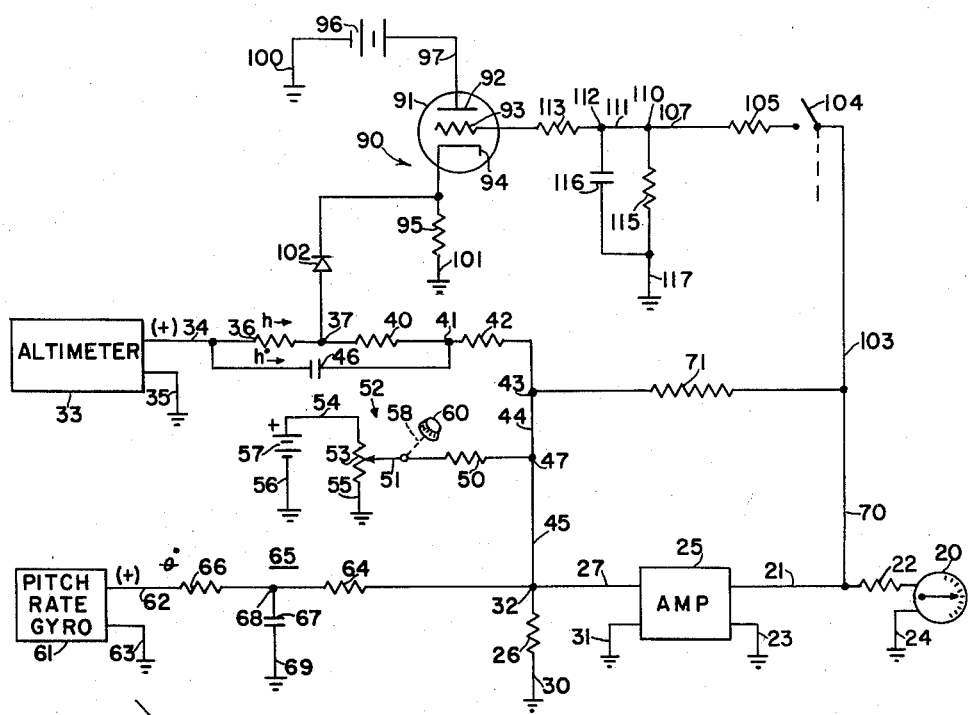

June 26, 1962  D. L. MARKUSEN ETAL  3,040,568
AIRCRAFT LANDING APPARATUS

Filed March 30, 1959  2 Sheets-Sheet 1

INVENTORS
ROBERT C. McLANE
DAVID L. MARKUSEN
BY

June 26, 1962

D. L. MARKUSEN ETAL 3,040,568

AIRCRAFT LANDING APPARATUS

Filed March 30, 1959

2 Sheets-Sheet 2

INVENTORS
ROBERT C. McLANE
DAVID L. MARKUSEN
BY George W. Field

3,040,568
AIRCRAFT LANDING APPARATUS
David L. Markusen, Minneapolis, and Robert C. McLane, St. Paul, Minn., assignors to Minneapolis-Honeywell Regulator Company, Minneapolis, Minn., a corporation of Delaware
Filed Mar. 30, 1959, Ser. No. 802,757
7 Claims. (Cl. 73—178)

This invention relates to the field of aeronautics, and more particularly to equipment for use in bringing about the landing of aircraft with greater ease, comfort, and safety than has heretofore been possible.

Aircraft landing aids are well known: the most familar is probably the glide slope of the Instrument Landing System. Here a sloping path in space is created by radio transmitting means and detected by radio receiving means, and a needle in a cross pointer meter indicates, by its departure from the horizontal, whether the aircraft is above or below the desired path, so that the human pilot may correct the motion of the aircraft accordingly. Automatic control of aircraft from the glide slope is also known.

An imperfection in the glide slope system is that the landing path is ideally a straight line intersecting the runway at an angle of normally 2½ degrees. Even so small an angle as this subjects the aircraft to considerable impact stresses, and flattening this angle involves a corresponding increase in the required runway length for the same clearance at the field boundary. To avoid this it has been proposed to "flare-out" the landing path by introducing an upwardly concave curve near the touchdown point, thus giving the effect of a flatter approach without proportionately increasing the required landing space. To this end it has been suggested that the radio transmitter or the radio receiver be modified, or that control from the glide slope equipment be replaced at low altitudes by some alternative arrangement. This last proposal has considerable merit, since the glide slope signal received in the aircraft deteriorates badly as the altitude approaches zero, because of ground reflections and other factors.

It is known to substitute for the glide slope equipment, at low altitudes, a computer which derives from the altitude and altitude rate of the aircraft a control signal which represents departure of the aircraft from an exponential or flared landing path. Such systems are found to be very satisfactory, but have the drawback that they are designed to become effective at a predetermined altitude. For the chosen relation between altitude and descent rate, which must govern such systems, it follows that an aircraft moving at some particular airspeed completes the landing perfectly, but that if the airspeed of the aircraft is greater than that for which the system is calculated, there may not remain sufficient time for the flare to be completed before impact.

This invention has for its object to improve the operation of flared landing systems by automatically taking into account the airspeed of the aircraft and initiating the operation of the computer at different altitudes accordingly. The present application covers this idea broadly, and also specifically as applied to aircraft control by a human pilot. Our copending joint application with Orville R. Pomeroy, Serial No. 761,567 filed September 17, 1958, and assigned to the assignee of the present invention, covers the apparatus specifically as applied to automatically controlled craft.

Various other objects, advantages, and features of novelty not particularly enumerated above which characterize our invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described certain preferred embodiments of our invention.

Figure 1:
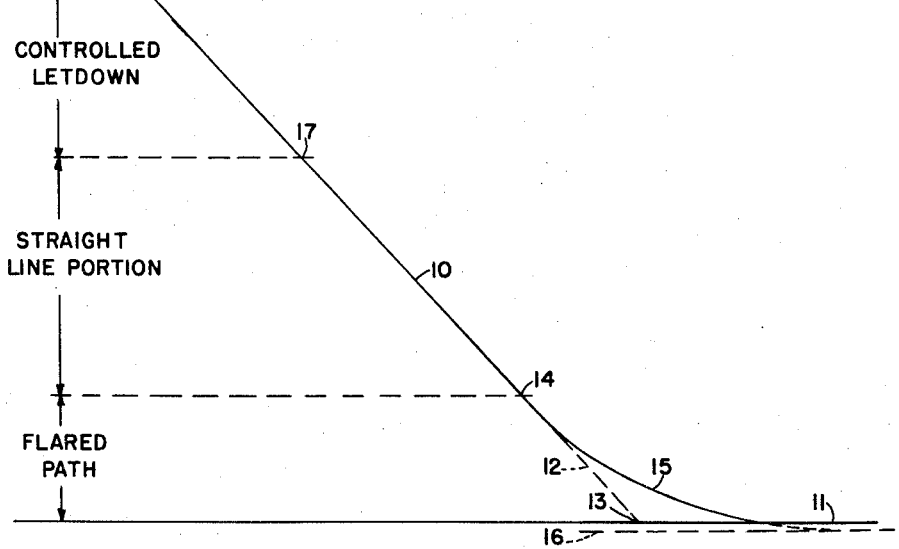
Figure 2:
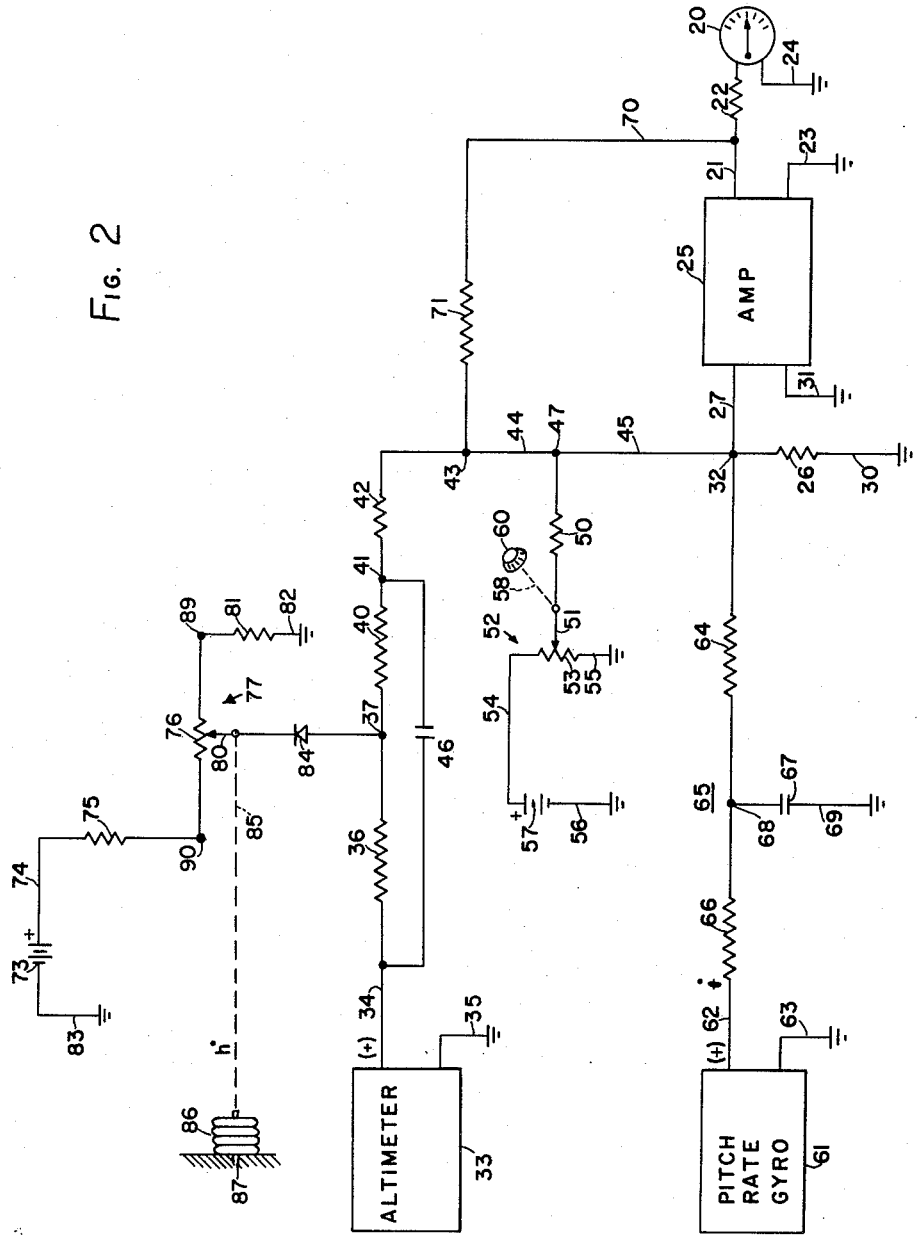

In the drawing FIGURE 1 is a diagrammatic showing of the characteristics of flared landings, FIGURE 2 is a diagrammatic showing of a first embodiment of the invention, and FIGURE 3 is a diagrammatic showing of a second embodiment of the invention.

The solid line 10 in FIGURE 1 shows in elevation the landing path of an aircraft, the vertical dimension being considerably exaggerated for illustrative purposes. It is assumed that the line 10 represents the glade path of the instrument landing system, and its broken extension 12 is shown to intersect the runway at point 13. For a flared approach, control by the glide path equipment is broken off at some point 14 and a computer is substituted to supply a signal which, if the craft is flown in accordance therewith, results in the curved path section indicated by the reference numeral 15. For perfect operation of such a computer, the curve 15 is asymptotic to the surface of runway 11, so that the practical touchdown point might be in some doubt. In order to avoid this the computer is provided with an asymptote adjustment, which modifies the observed altitude signal so that its effect on the computer is that of altitude above a line from one to four feet below the surface of the runway. By this means reliable contact with the runway even in the presence of head winds is assured. This is shown by the reference numeral 16.

For convenience in discussion, the portion of the line 10 below point 14 will be referred to as the flared path, the portion of line 10 between points 14 and 17 will be referred to as the straight line portion, and the portion of the path above point 17 will be referred to as the controlled letdown portion. In this last named portion the aircraft is following the glide path signal, and ideally is tracing a straight line having a constant slope of 2½ degrees with respect to the runway. However it will be apparent that the greater the airspeed of the craft along the slope, the greater its altitude rate or vertical velocity $\dot{h}$. Briefly, the invention functions to vary the altitude of the point 14, at which the flared path begins, in accordance with the airspeed and therefore the descent rate of the aircraft.

In its simple forms the equation for the desired flared path is $$h + 4\dot{h} = 0 \qquad (1)$$

where $\dot{h}$ is the altitude rate of the aircraft and $h$ is an altitude related to the actual elevation $h'$ of the aircraft above the runway, and to the asymptote distance $k$, by the equation.

$$h = h' + k \qquad (2)$$

In some cases it is helpful to add a signal representative of the aircraft pitch rate, $\dot{\theta}$, so that a computer is desirable having the capability of solving the equation $$h' + 4\dot{h} + \dot{\theta} + k = 0 \qquad (3)$$

The quantity $\dot{\theta}$ is a transient signal useful to the pilot in stabilizing the aircraft and has a negligible average value over the landing interval, so that Equation 1 basically describes the apparatus. This pitch rate signal, $\dot{\theta}$, would be unnecessary in an aircraft equipped with a stability augmentation device.

To conserve runway space it is desirable to follow the controlled letdown path as long as possible. The following table is of interest: The first column gives the airspeed $v$ of an aircraft along the 2½ degree glide slope, the second gives the associated altitude rate $\dot{h}$, descent being indicated by negative values, and the third is the altitude $h$ at which Equation 1 becomes satisfied.

TABLE I

| $v$ (m.p.h.) | $\dot{h}$ (ft. per sec.) | $h$ (feet) |
|---|---|---|
| 60 | −3.84 | 15.3 |
| 65 | −4.15 | 16.6 |
| 70 | −4.47 | 17.9 |
| 75 | −4.79 | 19.2 |
| 80 | −5.11 | 20.5 |
| 85 | −5.43 | 21.7 |
| 90 | −5.75 | 23.0 |
| 95 | −6.07 | 24.3 |
| 100 | −6.39 | 25.6 |
| 105 | −6.67 | 26.7 |
| 110 | −7.03 | 28.1 |
| 115 | −7.35 | 29.4 |
| 120 | −7.67 | 30.7 |

In the foregoing it becomes immediately apparent that if the flared path is begun at a particular altitude it can be followed properly only by a craft having a particular airspeed. For example, a system which initiates the flared path at an altitude of 23 feet is correct for an airliner, but would cause a jet aircraft to touch down before the flare was completed and would cause a light plane to float off the end of the runway before touchdown was accomplished. The object of the present invention is to avoid these difficulties by scheduling the changeover point with descent rate, that is, with airspeed. Means for accomplishing this are shown in FIGURES 2 and 3.

In FIGURE 2 there is shown supervisory means in the form of an indicator 20 arranged to be observed by the pilot of an aircraft. As long as the needle in indicator 20 is at the center of its scale, during the flared path 15 no operation by the human pilot is called for, but accordingly as the needle departs upwardly or downwardly from the center of the scale, the pilot is called upon to cause the aircraft to decrease or increase its rate of descent, in order to remain on the desired path. Indicator 20 is energized through conductor 21 and resistor 22 and ground connections 23 and 24 from an amplifier 25 having an input resistor 26 connected to the amplifier by conductor 27 and ground connections 30 and 31. The upper terminal of resistor 26 comprises a summation point 32, and the presence of a signal of one sense or the other at terminal 32 results in departure of the needle in indicator 20 in one sense or the other from its central position.

An altimeter 22 is shown as giving a signal between conductor 34 and a ground connection 35 which is representative of the instantaneous altitude $h'$ of the aircraft above the level of the runway. The output of altimeter 33 is applied across resistor 26 through ground connections 30 and 35 and through resistor 36, junction point 37, resistor 40, junction point 41, resistor 42, junction point 43, and conductors 44 and 45. A capacitor 46 is connected across resistors 36 and 40, so that the voltage supplied at terminal 32 has components representative of the actual value of the altitude $h'$ and of its rate of change $\dot{h}$.

A further signal is applied across resistor 26 through conductor 45, junction point 47, resistor 50, and the slider 51 of a voltage divider 52 having a winding 53 energized through conductor 54 and ground connections 55 and 56 from a suitable source of voltage indicated by a battery 57. Slider 51 is adjustable through a mechanical connection 58 by a knob 60 in accordance with the quantity $k$.

Also shown in FIGURE 2 is a pitch rate gyroscope 61 which supplies between the conductor 62 and a ground connection 63 a voltage which is representative of the pitch rate $\theta$ of the aircraft. This voltage is supplied to junction point 32 through a resistor 64 and a lag network 65 including a resistor 66 and a capacitor 67 connected to the junction point 68 between resistors 64 and 66 and to a ground connection 69.

For increased stability of operation a feedback loop for amplifier 25 may be traced through conductors 21 and 70, resistor 71, junction point 43, conductor 44, junction point 47, conductor 45, summation point 32, and conductor 27.

In the upper portion of FIGURE 2 there is shown a battery 73 which energizes a circuit including conductor 74, resistor 75, the winding 76 of a voltage divider 77 having a slider 80, resistor 81, and ground connections 82 and 83. A rectifier 84 is connected between junction point 37 and slider 80 in such a fashion as to permit the flow of current when junction point 37 is more positive than slider 80, and to prevent the flow of current when junction point 37 is less positive than slider 80. The diode thus acts as a limiter, in cooperation with resistor 36, and as long as the altitude of the craft is sufficient for the signal supplied by the altimeter to provide a voltage at junction point 37 greater than that of slider 80, the altitude component of the altimeter signal reaching summation terminal 32 is maintained at a constant value for any particular setting of the slider.

Slider 80 is arranged for adjustment through a mechanical connection 85 by an altitude rate responsive device 86, indicated in FIGURE 2 by a vented bellows having a restriction 87 in the venting opening.

Source 73 and resistors 76, 75 and 81 are so chosen that the voltage at terminal 90 of resistor 76 is equal to that at junction point 37 when the altimeter indicates an altitude of 80 feet, and the voltage at terminal 89 of resistor 76 is equal to the voltage present at junction point 37 when altimeter 33 indicates an altitude of 20 feet.

Operation of the Structure of FIGURE 2

Suppose an aircraft is in uniform descent in smooth air along the 2½ degree glide slope path, at an airspeed of 90 m.p.h. Then its pitch rate is zero, its altitude rate is constant at minus 5.75 feet per second, and flare out should begin according to Table I when the altitude decreases to 23 feet. After about eight seconds of this uniform descent slider 80 is stabilized by bellows 86 at a position representative of −5.75 feet per second altitude rate, and the altitude component of the altimeter output is limited at this value. At summation point 32 the altitude and altitude rate components of the altimeter signal are equal and opposite and their joint effect on amplifier 25 is zero. The needle of indicator 20 thus remains at its central zero position, except for a slight displacement due to a signal from asymptote device 52 which at this time can be ignored.

During this portion of the descent the human pilot has been controlling the aircraft in accordance with the glide slope signal. At an altitude of about one hundred feet, suggested by the point 17 in FIGURE 1, he discontinues following the glide slope cross pointer meter in elevation, and instead follows indicator 20, which gives no signal as long as his altitude rate remains the same. If the altitude rate changes, the rate component of the altimeter signal changes at once, while the movement of slider 80 lags, and a different signal is supplied through resistor 42 to amplifier 25, causing indicator 20 to give an indication to the pilot that he is to change his control of the aircraft. As a practical matter indicator 20 can in fact be the horizontal movement of the I.L.S. cross pointer indicator, the signal from amplifier 25 being substituted by appropriate means for that from the glide slope coupler at the point 17.

As the aircraft passes an altitude of 23 feet, at the nominal descent rate, the voltage at terminal 37 becomes less than that at slider 80, diode 84 becomes in effect an open circuit, and the altitude component of the altimeter signal becomes less than the rate component. The signal to amplifier 25 is no longer zero and indicator 20 calls for raising the nose of the aircraft. This action results in a change in the altitude rate, and the process continues until touchdown.

As pointed out previously, the provision of pitch rate gyro 61 is purely a refinement. During the descent prior to point 14, which is the interval to which the present invention is pertinent, any pitch rate is due to gusts or human control errors, and has a zero average value: during the flare out the lagged pitch rate signal helps the pilot to produce a smooth path. However, neither the pitch rate gyro nor the asymptote adjusting device are necessary to the inventive concept of programming the beginning of the flare out with airspeed.

The Structure of FIGURE 3

A second preferred form of the invention is shown in FIGURE 3, where the reference numerals up to 71 refer to structure which is identical with that in FIGURE 2, and elements 73 to 87 are replaced by structure about to be described. FIGURE 3 shows a cathode follower 90 including a triode 91 having an anode 92, and a grid 93, a cathode 94, and a cathode resistor 95. Triode 91 is energized from a source 96 through conductor 97 and ground connections 100 and 101. A diode 102 is connected between cathode 94 and junction point 37 in such a fashion as to prevent conduction when cathode 94 is more positive than junction point 37. Grid 93 of triode 91 is connected to the output of amplifier 25 through conductors 21, 70, and 103, a single pole-single throw switch 104, isolating resistor 105, conductor 107, junction point 110, conductor 111, junction point 112, and isolating resistor 113. A resistor 115 and a capacitor 116 are connected between junction points 110 and 112 respectively and a common ground connection 117 to comprise a lag network on the signal from amplifier 25.

Operation of FIGURE 3

Switch 104 is closed while the aircraft is being guided by the glide slope signal. Source 96 and resistor 95 are adjusted so as to give a normal descent rate bias on diode 102 in absence of signal from amplifier 25. For the ideal case in uniform descent along the 2½ degree glide slope, the output from amplifier 25 is, as before, the sum of the altitude rate signal through capacitor 46 to the signal supplied through resistor 40; if these two signals are not equal, an output is supplied to the grid of triode 91 changing the current through the tube and hence the voltage drop across resistor 95. This in turn changes the back bias on diode 102 and accordingly increases or decreases the voltage on point 37 at which triode 91 conducts. The gain around this system including amplifier 25 and triode 91 is such that the output of amplifier 25 is maintained substantially zero.

The voltage on the grid of triode 91 also charges capacitor 116. When the point 17 of the descent path is reached, the human pilot opens switch 104, thus preventing further change in the grid voltage on triode 91. Capacitor 116 has been charged, however, to a voltage representative of the average rate of descent of the aircraft during the previous interval. The time constant of the network including the capacitor, resistor 115, and the resistance to the ground through the triode, is large enough to prevent substantial change in the grid voltage during the straight line portion of the path. Thus, just as in FIGURE 2, the point at which the voltage at terminal 37 begins to decrease, thus beginning the flare path, is determined substantially by the altitude rate of the aircraft, and the flare out begins earlier for fast moving aircraft than for slow moving ones.

Refinements in this circuit are the same as those in FIGURE 2, and include the asymptote device and the lagged pitch rate of circuitry. As before, these are additional features and do not affect the basic inventive concept.

Numerous objects and advantages of our invention have been set forth in the foregoing description, together with details of the structure and function of the invention, and the novel features thereof are pointed out in the appended claims. The disclosure, however, is illustrative only, and we may make changes in detail, within the principle of the invention, to the full extent indicated by the broad general meaning of the terms in which the appended claims are expressed.

We claim as our invention:

1. Means for use in controlling the descent of an aircraft in such a manner that its descent rate is a desired function of its altitude comprising, in combination: means supplying a first signal representative of the altitude of the aircraft and hence the desired rate of descent of the aircraft; means supplying a second signal representative of the actual descent rate of the aircraft; supervisory means connected to receive said signals for giving an output representative of the difference therebetween; adjustable means connected between the first named means and said supervisory means for limiting the effect of said first signal on said supervisory means to that corresponding to a selected value of said first signal so that the value of said first signal is representative of a predetermined value of desired descent rate for all values of said first signal greater than said selected value; and means adjusting said adjustable means as a function of the descent rate of the aircraft.

2. Means for use in controlling the descent of an aircraft in such a manner that its descent rate is a desired function of its altitude comprising, in combination: means supplying a first signal representative of the altitude of the aircraft and hence the desired rate of descent of the aircraft; means supplying a second signal representative of the actual descent rate of the aircraft; supervisory means connected to receive said signals for giving an output representative of the difference therebetween; adjustable means connected between the first named means and said supervisory means for limiting the effect of said first signal on said supervisory means to that corresponding to a selected value of said first signal so that the value of said first signal is representative of a predetermined value of descent rate for all values of said first signal greater than said selected value; and means adjusting said adjustable means as a function of the deviation of the aircraft movement from a desired movement.

3. Means for use in controlling the descent of an aircraft in such a manner that its descent rate is a desired function of its altitude comprising, in combination: means supplying a first signal representative of the altitude of the aircraft and hence the desired rate of descent of the aircraft; means supplying a second signal representative of the actual descent rate of the aircraft; supervisory means connected to receive said signals for giving an output representative of the difference therebetween; adjustable means connected between the first named means and said supervisory means for limiting the effect of said first signal on said supervisory means to that corresponding to a selected value of said first signal so that the value of said first signal is representative of a predetermined value of descent rate for all values of said first signal greater than said selected value; and means adjusting said adjustable means as a function of the deviation of the aircraft descent from a desired value.

4. Means for use in controlling the descent of an aircraft in such a manner that its descent rate is a desired function of its altitude comprising, in combination: means supplying a first signal representative of the altitude of the aircraft and hence the desired rate of descent of the aircraft; means supplying a second signal representative of the actual descent rate of the aircraft; supervisory means connected to receive said signals for giving an output representative of the difference therebetween; adjustable means connected between the first named means and said supervisory means for limiting the effect of said first signal on said supervisory means to that corresponding to a selected value of said first signal so that the value of said first signal is representative of a predetermined value of descent rate for all values of said first signal greater than said selected value; and means adjusting said adjustable means as a function of the deviation of the aircraft descent rate from a desired value.

5. Apparatus of the class described comprising, in combination: means giving a first signal representative of the altitude of an aircraft descending along a predetermined glide slope; means giving a second signal representative of the altitude rate of the aircraft; adjustable means normally limiting said first signal to a value determined by the normal altitude rate of the aircraft; means combining said first and second signals to give a supervisory output; and means adjusting said adjustable means in accordance with said output.

6. Apparatus of the class described comprising, in combination: means giving a first signal representative of the altitude of an aircraft descending along a predetermined glide slope; means giving a second signal representative of the altitude rate of the aircraft; adjustable means normally limiting said first signal to a value determined by the normal altitude rate of the aircraft; means combining said first and second signals to give a supervisory output; and means adjusting said adjustable means in accordance with variation in said altitude rate.

7. Apparatus for use in controlling the descent to a landing surface of aircraft moving at different speeds, comprising, in combination: means giving a signal which represents the departure of an aircraft from a selected rectilinear descent path terminating at said surface; means for modifying said signal to represent departure of the aircraft from any selected one of a family of curved paths tangent to said first path at different altitudes and asymptotic to a datum line of known disposition relative to said landing surface; and means initiating continuous operation of said modifying means at an altitude of the aircraft determined by the rate of descent thereof, whereby to select one of said family of paths in accordance with the speed of the aircraft.

References Cited in the file of this patent
UNITED STATES PATENTS

| | | |
|---|---|---|
| 2,830,291 | Hecht et al. | Apr. 8, 1958 |
| 2,841,345 | Halpert et al. | July 1, 1958 |
| 2,845,623 | Iddings | July 29, 1958 |